T. SILK.
BUCKET BAIL.
APPLICATION FILED JULY 3, 1912.
1,064,099.
Patented June 10, 1913.
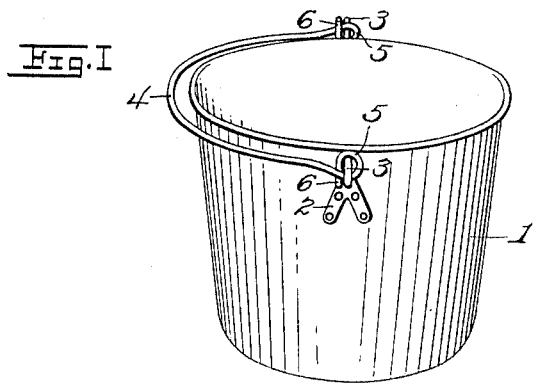
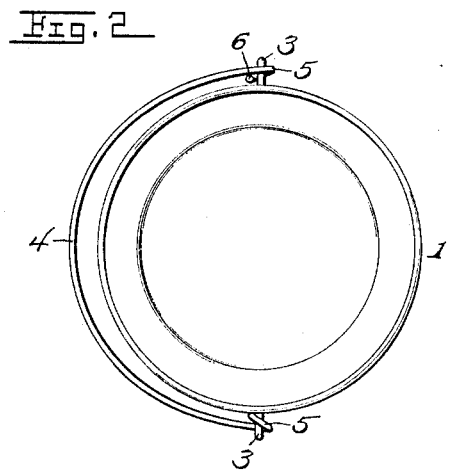
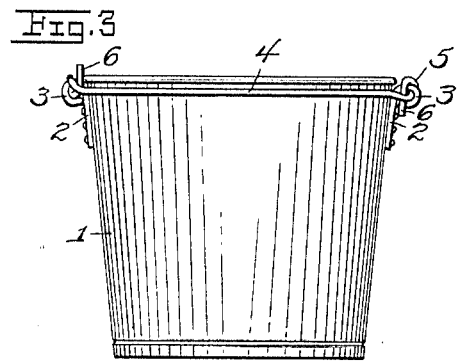
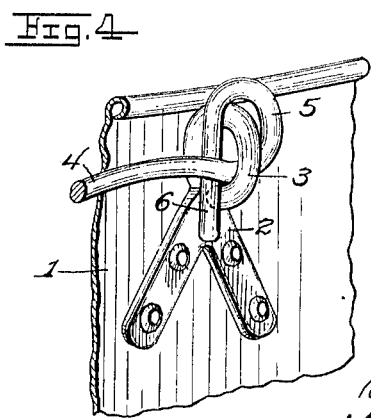
WITNESSES:
F. E. Arthur,
Bruce Morris.
INVENTOR—
Thomas Silk,
BY
ATTORNEY

UNITED STATES PATENT OFFICE.

THOMAS SILK, OF MARTINS FERRY, OHIO, ASSIGNOR TO WHEELING CORRUGATING COMPANY, A CORPORATION OF WEST VIRGINIA.

BUCKET-BAIL.

1,064,099.

Specification of Letters Patent.

Patented June 10, 1913.

Application filed July 3, 1912. Serial No. 707,491.

*To all whom it may concern:*

Be it known that I, THOMAS SILK, a citizen of the United States of America, and resident of Martins Ferry, county of Belmont, and State of Ohio, have invented certain new and useful Improvements in Bucket-Bails, of which the following is a specification.

This invention relates to improvements in bucket bails, and it has for its object to provide means whereby a bucket bail or handle is supported in a predetermined position out of contact with the body of the bucket.

The work of collecting sap from trees, as in pitch camps, sugar camps, and the like, is ordinarily performed when the weather is more or less cold, and the workmen therefore usually collect the buckets employed for receiving the fluid with mittened or gloved hands. When the bucket bail drops close against the body of the bucket, as ordinarily, considerable difficulty is encountered and much time wasted in elevating the bail to a position where a grasping hold may be obtained with such gloved or mittened hand. And it is the object of the present invention to provide a bucket bail having simple and inexpensive means whereby it is at all times maintained in position to be conveniently grasped.

The invention consists in the features of construction and arrangement which will hereinafter be fully described, reference being had to the accompanying drawings, forming a part of this specification, in which—

Figure 1 is a perspective view of a bucket illustrating the application of my invention; Fig. 2 is a top plan view of the same; Fig. 3 is a side elevation of the same; and Fig. 4 is an enlarged fragmentary view illustrating in perspective the bail-supporting means.

Referring to said drawings, in which like designating characters distinguish like parts throughout the several views 1 indicates a bucket having ears 2 attached thereto, the upper end or eye portion 3 of each ear being of substantially ring or loop form and occupying an outstanding position at right angles to the body of the bucket. A bail 4, preferably formed of wire, has its opposite ends linked to said ears, being directed through the eyes of the latter. Each bail end is bent to form a loop 5 with a substantially straight terminal member 6 which lies across and close to the bail body at substantially right angles to the latter, being extended to constitute a stop adapted to engage the lower part of the eye portion 3, as is clearly shown in Fig. 4, whereby the bail body is sustained in a substantially horizontal position and out of engagement with the bucket body. The opposite ends of the bail are linked to the opposite ears in reverse positions, so that the opposite terminals 6 are reversely disposed. Thus, whether the bail falls to one side or the other when not in use, one of said terminals assumes abutting engagement with the adjacent ear for supporting the bail in convenient position for grasping with the hand.

Having thus described my invention, what I claim as new, and desire to secure by Letters Patent, is—

1. The combination with a vessel having ears with eye portions which stand at substantially right angles to the vessel, of a bail having its ends bent to form loops which are linked through said eye portions, the loop terminals being directed across and beyond the bail body to form stops adapted to abut against said eye portions when the bail assumes a substantially horizontal position.

2. The combination with a vessel having ears with eye portions which stand at substantially right angles to the vessel, of a bail having its opposite ends bent to form reversely disposed loops which are linked through said eye portions, the loop terminals being directed across and beyond the bail body to form reversely disposed stops adapted to assume substantially vertical bail-supporting engagement with said eye portions when the bail assumes either of two predetermined positions.

3. The combination with a vessel having ears with loop-like eye-portions disposed at right angles thereto, of a bail having its ends linked in said eye-portions, each of said ends being bent to form a loop and terminating in a member which crosses the bail body at substantially right angles, said member being adapted to assume substantially vertical position against the contiguous eye portion for supporting the bail body in predetermined position.

In testimony whereof, I affix my signature in presence of two subscribing witnesses.

THOMAS SILK.

Witnesses:
E. K. DAY,
G. G. BROMER.